United States Patent Office 3,163,683
Patented Dec. 29, 1964

3,163,683
TERNARY BLENDS OF VINYL CHLORIDE POLYMER - BUTADIENE / ACRYLONITRILE COPOLYMER RUBBER-ETHYLENE POLYMER AND PROCESSES FOR MAKING THE SAME
Ival O. Salyer and Harry Philip Holladay, Dayton, Ohio, assignors to Monsanto Company, a corporation of Delaware
No Drawing. Filed July 22, 1960, Ser. No. 44,576
9 Claims. (Cl. 260—889)

This invention relates to vinyl chloride polymers. In one aspect, this invention relates to vinyl chloride compositions comprising ternary blends of vinyl chloride polymers, butadiene/acrylonitrile copolymer rubber, and ethylene polymer. In another aspect, this invention relates to methods for making ternary blends of vinyl chloride polymer, butadiene/acrylonitrile copolymer rubber, and ethylene polymer.

The many valuable properties of vinyl chloride polymers are well known since this polymer has become one of our most important plastics of commerce. Unfortunately, this polymer has one serious disadvantage, namely, relatively poor impact resistance, which precludes its extensive use in fabricating rigid articles that must withstand blows in normal usage.

It is well known that the impact strength of vinyl chloride polymers can be increased by intimately admixing with the vinyl chloride polymer a butadiene/acrylonitrile copolymer rubber to form a binary polyblend. However, the butadiene/acrylonitrile rubber is compatible with vinyl chloride polymer and, therefore, has a plasticizing effect on the polyblend composition particularly in polyblend compositions containing the larger amounts of the butadiene/acrylonitrile rubber having the higher impact strength properties. Thus, a polyblend composition containing 35% butadiene/acrylonitrile rubber has an impact strength of 25 ft.-lb./in. notch, as compared with an impact strength of 0.7 ft.-lb./in. notch for unblended vinyl chloride, but this polyblend composition is very soft and rubbery having a very low torsional stiffness modulus, low tensile strength, low room temperature modulus, and high percent elongation. Polyvinyl chloride polyblend compositions of these physical properties have very limited use, for applications requiring rigidity even though the impact strength is high.

We have discovered that the compatibility of vinyl chloride polymer and butadiene/acrylonitrile copolymer compositions can be reduced by blending into said composition an ethylene polymer to form a ternary polyblend composition having improved properties.

An object of this invention is to provide improved vinyl chloride polymer compositions.

Another object of this invention is to provide ternary polyblend compositions of vinyl chloride polymer, butadiene/acrylonitrile copolymer rubber, and ethylene polymer.

Another object of this invention is to provide a method of raising the impact strength of vinyl chloride polymer compositons without plasticizing said compositions.

Another object of this invention is to provide a method for raising the torsional stiffness modulus, tensile strength, and room temperature modulus, and for lowering the percent elongation of vinyl chloride polymer-butadiene/acrylonitrile copolymer compositions.

Other aspects, objects and advantages of this invention will be apparent from a consideration of the accompanying disclosure and the appended claims.

In accordance with this invention, improved vinyl chloride polymer compositions are made by incorporating small amounts of both butadiene/acrylonitrile copolymer rubber and ethylene polymer in vinyl chloride polymers to form a ternary blend of the same. The novel ternary polyblends of this invention comprise a major proportion of vinyl chloride polymer and a minor proportion of both butadiene/acrylonitrile rubber and ethylene polymer. Ordinarily, the ternary blends of this invention comprise 40–96 wt. percent vinyl chloride polymer, 2–30 wt. percent butadiene/acrylonitrile copolymer rubber, and 2–30 wt. percent ethylene polymer. Preferably, the butadiene/acrylonitrile copolymer rubber is present in the ternary blends in an amount at least equal to, and more preferably in excess of, the amount of ethylene polymer present. Although these proportions of addends in the novel vinyl chloride polymer compositions of this invention are preferred, other compositions outside the stated proportions can also be formed with fewer improvements in physical properties and with improvements to a lesser degree than are obtained in the preferred compositions.

The vinyl chloride polymers utilized in this invention are unplasticized polyvinyl chloride and unplasticized interpolymers containing at least 80% by weight of vinyl chloride and up to 20% by weight of one or more ethylenically unsaturated compounds such as vinyl acetate, vinyl chloride, ethyl acrylate, acrylonitrile, dibutyl maleate, and the like. Mixtures of such vinyl chloride polymers can aso be used if desired.

The vinyl chloride polymers may be prepared by any of the polymerization techniques known to and employed by those skilled in the art, including such methods as solution, suspension, emulsion, and mass polymerization techniques. The vinyl chloride resins employed in the ternary compositions of this invention most generally have weight average molecular weights in the range of from 30,000 to 500,000, although higher or lower molecular weight vinyl chloride resins are useful to some extent in the present invention. The molecular weights referred to are determined by light scattering in methyl ethyl ketone solution.

The term "vinyl chloride polymer" as used herein is intended to include homopolymers of vinyl chloride, i.e., polymers prepared by subjecting to polymerization a monomeric material consisting of vinyl chloride as the sole polymerizable constituent, and copolymers of vinyl chloride with other ethylenically unsaturated monomers copolymerizable therewith; however, it is to be understood that such copolymers can be employed whenever reference is made herein to "polyvinyl chloride resins."

The butadiene/acrylonitrile copolymer rubbers utilized in this invention are preferably the "high nitrile content" rubbers having acrylonitrile contents within the range of from 30 to 40 wt. percent. However, the "low nitrile content" rubbers having acrylonitrile contents within the range of from 15 to 30 wt. percent can also be used but with less advantageous improvements. The butadiene/acrylonitrile copolymer rubbers are well known articles of commerce of which trade names such as "Paracril" and "Hycar" are examples. While this invention is directed particularly to the use of butadiene/acrylonitrile copolymer rubbers wherein butadiene and acrylonitrile are the sole monomers subjected to polymerization, it is permissible and not outside the broad scope of this invention to employ other butadiene/acrylonitrile copolymer rubbers prepared from monomeric mixtures comprising mostly butadiene and acrylonitrile plus other polymerizable unsaturated comonomers in amounts preferably not to exceed 15 wt. percent of total monomers, provided such comonomer, for example isoprene, methacrylonitrile, styrene, butyl acrylate, and methyl methacrylate, is not of such nature or of such quantity as to effect adversely the desired characteristics of the resulting butadiene/acrylonitrile copolymer products. Such butadiene/acrylonitrile copolymer rubbers may be prepared by any of the known methods for preparing copolymers although copolymer rubbers prepared by emulsion polymerization techniques usually give the best results.

The third major component of the novel composition of this invention is an ethylene polymer; that is, a normally solid high molecular weight polymer of ethylene. Such polymers usually have number average molecular weights of at least 6000 and preferably for the practice of this invention have molecular weights above 15,000. Ethylene polymers useful in this invention are also characterized by a melt index at 190° C. of 1 to 10, a density less than 0.930 and a weight average molecular weight depending upon distribution of from 30,000 to 300,000. Ethylene polymers suitable for use in this invention can be prepared by any of the methods well known to those skilled in the art, for example by subjecting ethylene containing from 10 to 200 p.p.m. oxygen to polymerization at very high pressures in the range of from 20,000 to 45,000 p.s.i. Another method for preparing solid polyethylene employs a peroxide or azo catalyst and water or an organic liquid reaction medium along with a moderately high pressure in the range of from 5000 to 15,000 p.s.i. Also, as is well known in the art, ethylene polymers of greater rigidity and higher density can be prepared at relatively low pressure, e.g., less than 1000 p.s.i. using organometallic and metal oxide-supported catalysts.

The term "ethylene polymer" as used herein is intended to include homopolymers of ethylene, i.e., polymers prepared by subjecting to polymerization a monomeric material consisting of ethylene as the sole polymerizable constituent, and copolymers of ethylene with other ethylenically unsaturated monomers copolymerizable therewith; however, it is to be understood that such copolymers can be employed whenever reference is made herein to "polyethylene polymers." Thus, it is not outside the scope of this invention to utilize a solid ethylene polymer which is a copolymer of ethylene and an ethylenically unsaturated comonomer employed in an amount preferably not to exceed 15 wt. percent of the ethylene; for example, propylene, butene-1, butadiene, isoprene, styrene, vinyl acetate, vinyl chloride, vinylidene chlorofluoride and methyl methacrylate.

The ternary polyblend compositions of this invention are prepared by intimately admixing the vinyl chloride polymer, butadiene/acrylontirile copolymer rubber, and the ethylene polymer together. These components may be mixed in any order and may be in any conventional form. Preferably, all three components are admixed together in a suitable container to form a rough mix which is then mixed on a conventional mixing machine of the type normally used for mixing rubber or plastics, e.g., a mill roll or a Banbury mixer, or extruder. If desired, the vinyl chloride polymer can be first placed on a mill roll and, after a smooth rolling bank has formed in the nip of the rolls, the other two components of the blend added either separately of as a mixture. Regardless of the method by which the mixing of the ingredients is accomplished, it is necessary that the components be admixed together or worked under sufficient heat and pressure to insure efficient dispersion of the various components in the mixture to form a completely homogeneous material. The temperature at which this working or mastication is conducted is not critical so long as the temperature is at least above that where the vinyl chloride polymer fuses and not above the temperature where the vinyl chloride polymer decomposes. Usually a temperature above about 300° F. or 325° F. and less than about 350° F. or 375° F. is sufficient to obtain an adequately intimate combination of the materials. If desired, suitable minor ingredients can also be included in the ternary polyblends of this invention, including such ingredients as fillers, dyes, pigments, stabilizers, and the like. Preferably, heat stabilizers are added with the vinyl chloride polymer as it is placed in the mixing equipment.

The ternary polyblend compositions obtained in this invention can be produced in any of the conventional forms. For example, the product can be calendered to form very thin, smooth sheets, press molded, laminated, embossed, cut, drilled, or machined.

The advantages, desirability, and the usefulness of the present invention are illustrated by the following example.

EXAMPLE

Vinyl chloride polymer binary and ternary blends containing varying proportions of addends were prepared mechanically by milling the various mixtures of ingredients on 3 x 8 inch Thropp mill rolls heated to a temperature of approximately 350° F. A rough mix was first prepared from the powdered vinyl chloride polymer, butadiene/acrylonitrile copolymer cut-up into small pieces, and the powdered or pelleted ethylene polymer. The required amounts of these ingredients, together with 2% Thermolite 31 stabilizer, were admixed by hand in a stainless steel beaker. Thereafter, the rough mix was placed on the heated mill rolls and the components thoroughly homogenized by intensive hot milling for 5 minutes or until an adequate dispersion was obtained. The material was repeatedly cut back during the milling operation in order to make sure a complete dispersion of the components was obtained. After blending of the components was complete, as evidenced by visual inspection, the blends were sheeted and stripped from the mill rolls. The sheets were cooled to room temperature and cut into shapes approximating the configuration of the mold in which the compression molded specimens were made. The material was molded between pressed polished plates using 30 ton Motch and Merryweather press. The samples were first given a three minute preheat at a pressure of approximately 50 p.s.i.g. hydraulic pressure and then heated for a period of 5 minutes with a final temperature of approximately 350° F. and a final hydraulic pressure of 1000 p.s.i.g. At the end of this time, the specimens were cooled to room temperature with water and removed from the press. The desired physical test specimens were then cut from the compression molded material for the determination of various physical properties of the blend.

The physical properties of the various blends are reported in Table I. These physical properties were determined according to the standard ASTM procedures, more specifically, the notched impact strength was determined by the Izod method as set forth in ASTM D-256-47T, the Clash-Berg data were determined according to ASTM D-1043-51, and the tensile strength properties were determined according to ASTM D-882-46.

The physical properties reported in Table I were measured on specimens prepared from a commercially available polyvinyl chloride resin identified as "Opalon 300" to which had been added 2% by weight of "Thermolite RS-31" which is a tin mercaptide heat stabilizer. The butadiene/acrylonitrile copolymer rubber was obtained commercially and identified as "Hycar OR-15 EP," containing 45% acrylonitrile, or identified as "Paracril BV," containing 30% acrylonitrile. The ethylene polymer was obtained commercially and was identified by the trade name "Alkathene 2."

Table I

PROPERTIES OF VINYL CHLORIDE POLYMER-BUTADIENE/ACRYLONITRILE COPOLYMER RUBBER-ETHYLENE POLYMER POLYBLENDS [1]

| Composition Percent | | | Izod Impact Strength, ft.-lb./in. | Clash-Berg Data | | | | Tensile Properties | |
|---|---|---|---|---|---|---|---|---|---|
| Vinyl Chloride Polymer [2] | Butadiene/Acrylonitrile Rubber | Ethylene Polymer [6] | | $T_{2000}$ °C. | $T_f$ °C. | SFR | Room Temp. Mod. $\times 10^{-4}$ | Strength at Break, p.s.i. | Percent Elongation at Break |
| 100 | | | 0.7 | 86.3 | 72.4 | 13.9 | 50 | 8,000 | 160 |
| 93 | [3] 7 | | 0.5 | 83.9 | 54.3 | 29.6 | 70 | 7,000 | 245 |
| 85 | [3] 15 | | 1.0 | 81.3 | 35.8 | 45.5 | 25 | 6,000 | 225 |
| 75 | [4] 25 | | 2.3 | 71.2 | 21.4 | 49.8 | 10 | 5,400 | 380 |
| 65 | [4] 35 | | 25.0 | 51.6 | 3.3 | 48.3 | 1.5 | 3,200 | 480 |
| 88 | [5] 8 | 4 | 16.4 | 81.8 | 52.0 | 29.8 | | 4,519 | 139 |
| 78 | [4] 15 | 7 | 20.3 | 77.3 | 37.3 | 40.9 | 26.0 | 4,160 | 110 |
| 85 | [4] 10 | 5 | 14.8 | 82.3 | 44.5 | 37.8 | 34.0 | | |
| 80 | [4] 15 | 5 | 17.2 | 75.0 | 26.4 | 49.1 | 17.0 | 4,700 | 172 |
| 78 | [4] 15 | 7 | 18.0 | 74.6 | 32.5 | 42.1 | 21.0 | 4,300 | 114 |

[1] All polyblends contain 2% Thermolite 31 stabilizer.
[2] Opalon 300 vinyl chloride polymer.
[3] Hycar OR-25 Butadiene/acrylonitrile rubber containing 30% acrylonitrile.
[4] Hycar OR-15 EP Butadiene/acrylonitrile rubber containing 45% acrylonitrile.
[5] Paracril BV Butadiene/acrylonitrile rubber containing 30% acrylonitrile.
[6] Alkathene 2 polyethylene.

It can readily be seen by the data in Table I that the impact strength of vinyl chloride polymer can be increased by mechanically blending a butadiene/acrylonitrile rubber with the vinyl chloride polymer. Although a very substantial increase of impact strength of 25 ft.-lb./in. is obtained using 35 wt. percent butadiene/acrylonitrile, the heat resistance, Clash-Berg $T_{2000}$ temperature and the stiffness and tensile strength are all undesirably lowered, thereby making the product unsuitable for rigid applications. It will be observed from the data in Table I that the addition of either 5 or 7 wt. percent ethylene polymer to a binary blend of vinyl chloride polymer containing 15 wt. percent butadiene/acrylonitrile rubber raised the impact strength from 1.0 ft.-lb./in. to as high as from 15 to 20 ft.-lb./in. without excessive loss in the $T_{2000}$ temperature.

In general, the data in Table I also show that the improvements in impact strength obtained by the addition of ethylene polymer to the composition are not at the expense of the rigidity of the vinyl chloride polymer; that is, the stiffness of the vinyl chloride polymer is not substantially reduced by the presence of the ethylene copolymer in the composition. The Clash-Berg modulus data and the room temperature modulus data are a measure of the stiffness of the plastic specimens as a function of temperature. The brittle temperature ($T_f$) is the temperature at which the stiffnes modulus is 135,000 p.s.i., and the rubber temperature ($T_{2000}$) is the temperature at which the stiffness modulus is 2000 p.s.i. The stiff-flex range (SFR) is determined by difference. As shown in Table I, the ethylene polymer tends to lower the stiffness of the vinyl chloride polymer composition somewhat; however, on the basis of room temperature modulus the stiffness is more or less comparable to that of binary blends containing 15 wt. percent butadiene/acrylonitrile and this binary blend has a low impact strength of only 1.0 ft.-lb./in. However, it will be noted that when sufficient butadiene/acrylonitrile rubber is used in a binary blend to obtain a substantial increase in the impact strength, the room temperature modulus is very low, whereas the room temperature modulus of a ternary blend of high impact strength containing ethylene polymer is substantially higher. Thus, the ethylene polymer tends to reduce the plasticizing effect of the presence of large concentrations of butadiene/acrylonitrile in the blend and makes the vinyl chloride polymer and butadiene/acrylonitrile rubber less compatible.

The tensile data also show that the plasticizing effect of butadiene/acrylonitrile in a binary blend can be reduced by the addition of ethylene polymer to the blends; that is, that the tensile strength at break can be raised approximately 800 p.s.i. and the percent elongation at break can be lowered by about 370% by the addition of ethylene polymer to a binary blend of vinyl chloride polymer and butadiene/acrylonitrile copolymer rubber having comparable impact strengths.

The addition of ethylene polymer to a vinyl chloride polymer containing butadiene/acrylonitrile copolymer rubber results in the production of a rigid vinyl chloride resin blend having high impact strength, usually well above 5 ft.-lb./in. notch. This addition of ethylene polymer to a binary blend of vinyl chloride polymer and butadiene/acrylonitrile copolymer rubber can also be effected without substantial reduction in the stiffness of the resin, and, in fact, the stiffness of a binary blend containing a high proportion of butadiene/acrylontrile rubber can actually be increased by the addition of ethylene polymer to the blend. Furthermore, the rigid ternary blends of this invention ordinarily have fairly low percentages of tensile elongation at break and fairly high tensile strengths at break. It is believed that these improvements in vinyl chloride polymer compositions are obtained by controlling the compatibility of the vinyl chloride polymer and the butadiene/acrylonitrile copolymer rubber by the addition of the ethylene polymer to the composition since the high concentrations of butadiene/acrylonitrile copolymer rubber required for improving the impact strength of the vinyl chloride resin has a plasticizing effect on the composition at these concentrations.

The ternary blends of this invention are useful in making injection molded and compression molded articles, and can also be used in other forms, for example, as films, surface coatings, and monofilaments. They can also be mixed with other materials, such as pigments, plasticizers, natural and synthetic resins, fillers, and the like, according to procedures well known to those skilled in the art.

Reasonable variation and modification of the invention as described are possible, the essence of which is that there have been provided ternary polyblend compositions of vinyl chloride polymers comprising a major amount of a vinyl chloride polymer and a minor amount of both a butadiene/acrylonitrile copolymer rubber and an ethylene polymer, and methods for preparing the same.

We claim:

1. A rigid, high impact resistant vinyl chloride resin composition comprising from 40% to 96% by weight of a polyvinyl chloride resin, from 2% to 30% by weight of a butadiene/acrylonitrile copolymer rubber, and from 2% to 30% by weight of a normally solid ethylene polymer selected from the group consisting of ethylene homopolymer and copolymers of ethylene with up to 15 weight percent of a comonomer selected from the group consisting of propylene, butene-1, butadiene, isoprene, styrene, vinyl acetate, vinyl chloride, vinylidene chlorofluoride and methyl methacrylate.

2. The composition of claim 1 wherein said butadiene/acrylontrile rubber is present in an amount at least as large as the amount of said ethylene polymer present.

3. The composition of claim 1 wherein said butadiene/acrylonitrile copolymer rubber is present in an amount which is greater than the amount of said ethylene polymer present.

4. The composition of claim 1 wherein said butadiene/acrylontrile copolymer rubber contains from 30–50% by weight acrylonitrile.

5. A rigid, high impact resistant vinyl chloride resin composition comprising from 40% to 96% by weight of a polyvinyl chloride resin, from 2% to 30% by weight of a butadiene/acrylonitrile copolymer containing from 30% to 50% by weight acrylonitrile, and from 2% to 30% by weight of a normally solid polyethylene.

6. The composition of claim 5 wherein said butadiene/acrylontrile copolymer is present in an amount which is greater than the amount of said polyethylene present.

7. A rigid, high impact resistant vinyl chloride resin comprising polyvinyl chloride resin, about 15% by weight of butadiene/acrylonitrile copolymer rubber, and about 5% by weight of normally solid polyethylene.

8. A rigid, high impact resistant vinyl chloride resin comprising polyvinyl chloride resin, about 15% by weight of butadiene/acrylonitrile copolymer rubber, and about 7% by weight of a normally solid polyethylene.

9. A rigid, high impact resistant vinyl chloride resin comprising polyvinyl chloride resin, about 8% by weight of butadiene/acrylonitrile copolymer rubber, and about 4% by weight of a normally solid polyethylene.

References Cited in the file of this patent
UNITED STATES PATENTS

| | | |
|---|---|---|
| 2,592,763 | Taylor | Apr. 15, 1952 |
| 2,647,101 | Humphrey et al. | July 28, 1953 |
| 2,803,621 | Schwartz et al. | Aug. 20, 1957 |
| 2,919,206 | Malmquist | Dec. 29, 1959 |
| 2,927,346 | Hill | Mar. 8, 1960 |
| 2,944,040 | Pollock et al. | July 5, 1960 |
| 2,956,980 | Law | Oct. 18, 1960 |
| 2,964,487 | Chapman et al. | Dec. 13, 1960 |
| 3,006,889 | Frey | Oct. 31, 1961 |

FOREIGN PATENTS

| | | |
|---|---|---|
| 571,090 | Canada | Feb. 24, 1959 |